United States Patent
Woo

(10) Patent No.: US 7,826,206 B2
(45) Date of Patent: Nov. 2, 2010

(54) RECEIVING MODULE FOR A DISPLAY DEVICE, DISPLAY DEVICE INCLUDING THE SAME, AND METHOD THEREOF

(75) Inventor: Seung-Gyun Woo, Gyeongsangnam-do (KR)

(73) Assignee: Samsung Electronics Co., Ltd. (KR)

( * ) Notice: Subject to any disclaimer, the term of this patent is extended or adjusted under 35 U.S.C. 154(b) by 302 days.

(21) Appl. No.: 11/931,265

(22) Filed: Oct. 31, 2007

(65) Prior Publication Data
US 2008/0278895 A1 Nov. 13, 2008

(30) Foreign Application Priority Data
Dec. 19, 2006 (KR) .................. 10-2006-0129961

(51) Int. Cl.
*G06F 1/16* (2006.01)
(52) U.S. Cl. .................. 361/679.05; 349/60; 362/620; 40/717; 353/120
(58) Field of Classification Search ............ 361/679.02, 361/679.41, 679.04, 679.05, 679.21, 679.27, 361/679.28, 679.29; 349/58, 60; 362/633, 362/613, 620, 617; 40/610, 738, 717; 312/232.2; 353/30, 120
See application file for complete search history.

(56) References Cited

U.S. PATENT DOCUMENTS 7,445,371 B2 * 11/2008 Ma et al. ................ 362/633

| | | | |
|---|---|---|---|
| 2006/0274224 A1* | 12/2006 | Jeong ............ | 349/58 |
| 2008/0129921 A1* | 6/2008 | Huang et al. ..... | 349/60 |
| 2009/0262277 A1* | 10/2009 | Kim ............. | 349/58 |
| 2009/0290092 A1* | 11/2009 | Tang ............ | 349/61 |
| 2010/0123851 A1* | 5/2010 | Mo et al. ........ | 349/58 |

FOREIGN PATENT DOCUMENTS

| | | |
|---|---|---|
| JP | 2004-302290 | 10/2004 |
| KR | 1999-0068953 | 9/1999 |
| KR | 1020010036033 A | 6/2003 |

* cited by examiner

*Primary Examiner*—Hung V Duong
(74) *Attorney, Agent, or Firm*—Cantor Colburn LLP

(57) ABSTRACT

A receiving module for a display device includes a receiving frame and a receiving container. The receiving frame includes a bottom part and a plurality of side parts extending from a peripheral portion of the bottom part creating a receiving space. The receiving container includes a bottom plate and a plurality of sidewalls. The bottom plate is disposed on the bottom part. Each of the sidewalls includes a first side plate extending from an edge portion of the bottom plate and coupled to a corresponding side part to face an outer surface of each of the side parts, and a second side plate bent at an upper end of the first side plate to face an outer surface of the first side plate. Thus, the strength of a display device against an external force, such as a bending stress or a twisting stress, may be improved.

16 Claims, 7 Drawing Sheets

RECEIVING MODULE FOR A DISPLAY DEVICE, DISPLAY DEVICE INCLUDING THE SAME, AND METHOD THEREOF

This application claims priority to Korean Patent Application No. 2006-129961, filed on Dec. 19, 2006, and all the benefits accruing therefrom under 35 U.S.C. §119, the contents of which in its entirety are herein incorporated by reference.

BACKGROUND OF THE INVENTION

1. Field of the Invention

The present invention relates to a receiving module, a display device including the receiving module, and a method thereof. More particularly, the present invention relates to a receiving module capable of improving strength against an external force, such as a bending stress, a display device having the receiving module, and a method thereof.

2. Description of the Related Art

Generally, a liquid crystal display ("LCD") device includes a backlight assembly providing light to a display panel, so as to display an image at a place where light is insufficient. A small-sized mobile LCD device, such as a cellular phone or a personal digital assistant ("PDA"), typically includes a light-emitting diode ("LED") serving as a backlight assembly, which has advantageous characteristics such as small size, low power consumption, light weight, etc.

As a mobile device, such as a cellular phone, becomes slim, a thickness of an LCD panel becomes thinner, for example, from about 0.5 mm or about 0.4 mm to about 0.3 mm. Thus, the strength of a receiving module receiving an LCD panel, an optical unit, etc. is an important factor in evaluating the quality of an LCD device. The receiving module typically includes a mold frame receiving an optical unit and an LCD panel and a bottom chassis receiving the mold frame and including metal to strengthen the LCD device having the receiving module.

As a thickness of a substrate of the LCD panel becomes smaller, the LCD panel becomes weaker to externally applied bending and twisting stresses. Although the strength of the bottom chassis is more important so as to increase the strength of the display device, a thickness of the bottom chassis also becomes thinner.

Korean Laid-Open Patent Publication No. 2003-000305 discloses a display device, in which a bottom chassis having a U-shape is fastened to a rear surface of a mold frame to prevent movement of the bottom chassis even though external impact forces may be applied from any direction. However, the display device merely prevents movement of a bottom chassis, and has limits as to how much strength can be increased against an external force, such as a bending stress or a twisting stress.

Also, Japanese Laid-Open Patent Publication No. 2004-302290 discloses a coupling structure, in which a protrusion formed on a panel holder is inserted into a hole of a housing to firmly fasten the panel holder to the housing. However, the invention merely relates to a coupling structure for firmly coupling the panel holder to the housing, and does not suggest an idea of increasing strength against an external force such as a bending stress or a twisting stress.

BRIEF SUMMARY OF THE INVENTION

The present invention obviates the above problems by providing a module structure capable of increasing strength of a slim display device against an external force. The present invention provides a receiving module for a display device including a sidewall of a predetermined structure to improve strength against an external force such as a bending stress or a twisting stress.

The present invention also provides a display device having the above-mentioned receiving module.

The present invention further provides a method of improving the strength of a receiving module for a display device.

In exemplary embodiments of the present invention, a receiving module for a display device includes a receiving frame and a receiving container. The receiving frame includes a bottom part and a plurality of side parts extending from a peripheral portion of the bottom part to define a receiving space. The receiving container includes a bottom plate and a plurality of sidewalls. The bottom plate is disposed on a rear surface of the bottom part. Each of the sidewalls includes a first side plate extending from an edge portion of the bottom plate and coupled to a corresponding side part to face an outer surface of each of the side parts, and a second side plate bent at an upper end of the first side plate to face an outer surface of the first side plate.

The receiving frame may further include an engaging protrusion formed on at least one of the side parts, and the receiving container may have a first engaging hole formed through a first side plate, where the engaging protrusion is inserted into the first engaging hole. The receiving container may further include a catching protrusion protruding from an inner surface of the first side plate to catch an upper portion of the engaging protrusion. The second side plate may cover the first engaging hole, and extends toward a lower portion of the first side plate. The second side plate may make contact with the first side plate, such as face-to-face contact.

The receiving container may have a second engaging hole formed through the second side plate. The engaging protrusion inserts into the second engaging hole. The second engaging hole may be smaller than the first engaging hole. Alternatively, the receiving container may have an engaging groove formed on the side part, and the receiving container may further include an engaging protrusion formed at the first side plate to be inserted into the engaging groove. In other exemplary embodiments of the present invention, a display device includes a receiving frame, a receiving container, an optical unit, a point light source and a display panel. The receiving frame includes a bottom part including an opening at a central portion and a plurality of side parts extending from a peripheral portion of the bottom part to define a receiving space. The receiving container includes a bottom plate and a plurality of sidewalls. The bottom plate is disposed on a rear surface of the bottom part. Each of the sidewalls includes a first side plate extending from an edge portion of the bottom plate and coupled to the side part to face an outer surface of each of the side parts, and a second side plate bent at an upper end of the first side plate to face an outer surface of the first side plate. The optical unit is disposed on the bottom part. The point light source is disposed adjacent to an inner surface of at least one of the side parts of the receiving frame to face a side surface of the optical unit. The display panel is disposed on the optical unit and supported by a stepped portion formed at the side parts of the receiving frame.

The receiving frame may further include an engaging protrusion formed on an outer surface of at least one of the side parts, and the receiving container may have an engaging hole formed through a first side plate. The engaging protrusion is inserted into the engaging hole. The second side plate of the at least one of the sidewalls may cover and make contact with the engaging hole, and extends toward a lower portion of the first side plate. In still other exemplary embodiments of the present invention, a method for improving strength of a receiving module within a display device includes defining a receiving space in a receiving frame, the receiving frame including a bottom part and a side part extending from a peripheral portion of the bottom part, disposing a bottom plate of a receiving container on a rear surface of the bottom part, extending a first side plate of a sidewall of the receiving container from an edge portion of the bottom plate, coupling the first side plate to the side part to face an outer surface of the side part, and bending a second side plate at an upper end of the first side plate to face an outer surface of the first side plate.

The method may further include forming an engaging protrusion on the side part of the receiving frame, forming a first engaging hole through the first side plate of the receiving container, and inserting the engaging protrusion into the first engaging hole. The method may further include extending a catching protrusion from an inner surface of the first side plate to catch an upper portion of the engaging protrusion. Bending a second side plate at an upper end of the first side plate may include abutting the second side plate to the first side plate in face-to-face contact.

According to the above, a receiving container has a sidewall having a predetermined structure, and thus may have improved strength against an external force, such as a bending stress or a twisting stress, thereby the strength of a display device having the receiving container may be improved.

BRIEF DESCRIPTION OF THE DRAWINGS

The above and other features and advantages of the present invention will become more apparent by describing in further detail exemplary embodiments thereof with respect to the accompanying drawings, in which.

DETAILED DESCRIPTION OF THE INVENTION

Figure 1:
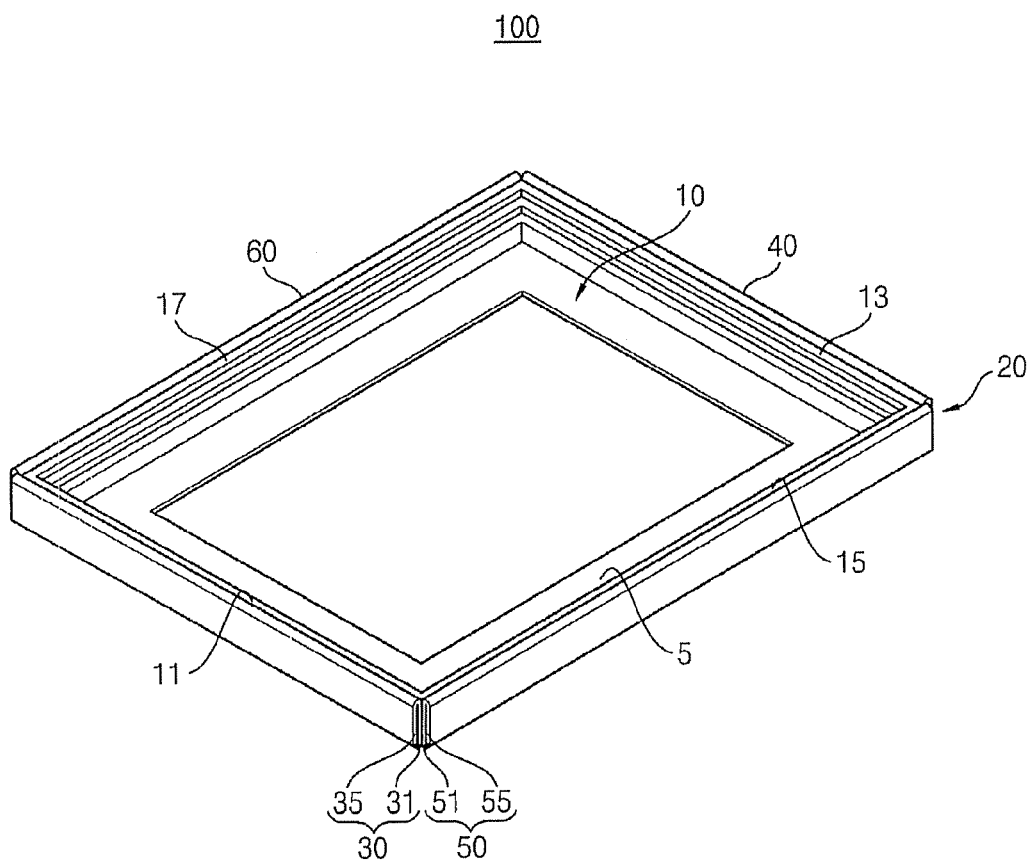
FIG. 1 is a perspective view illustrating an exemplary embodiment of a receiving module for an exemplary display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Receiving Module for a Display Device

Figure 2:
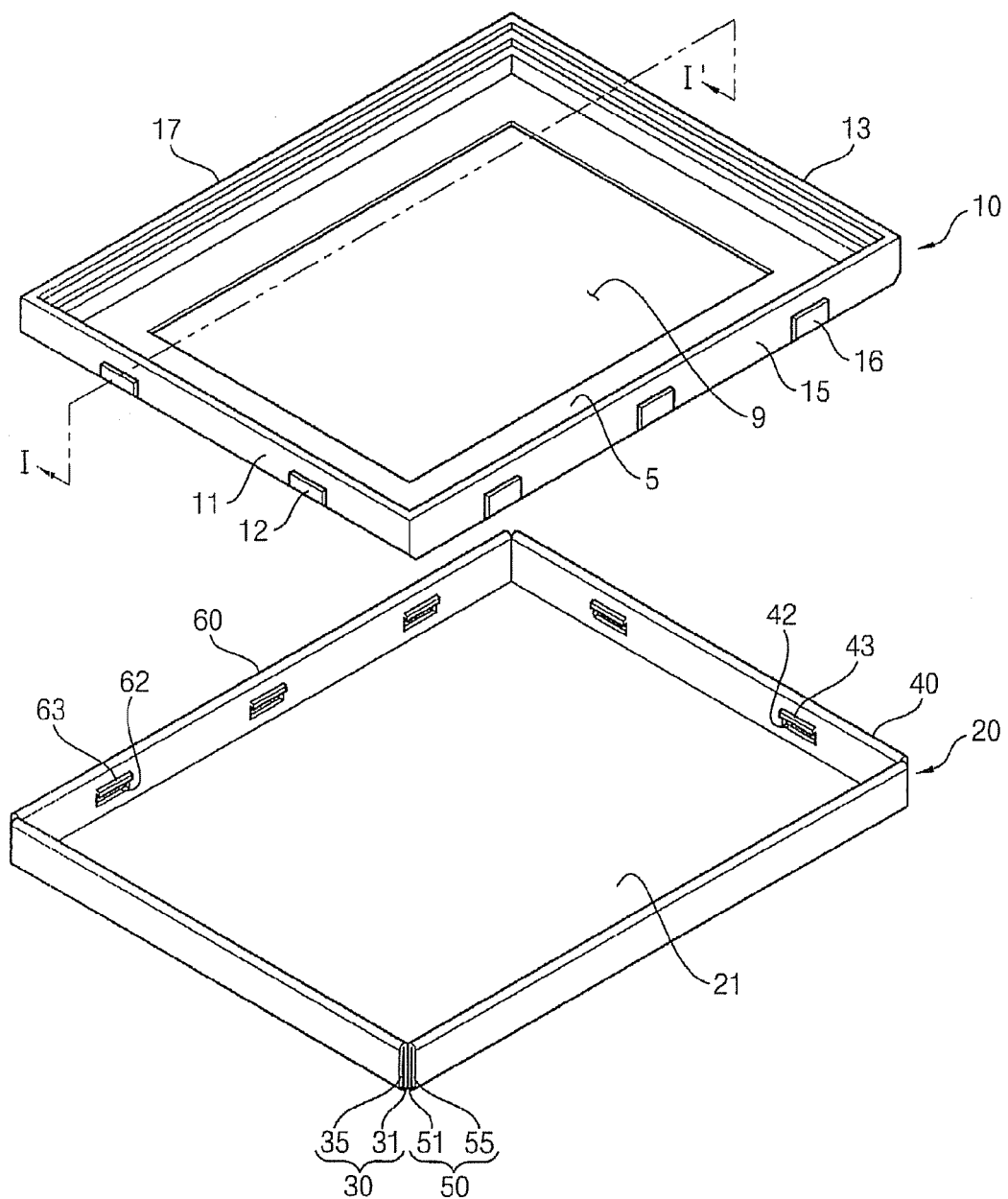
FIG. 2 is an exploded perspective view illustrating the exemplary receiving module in FIG. 1.

FIG. 1 is a perspective view illustrating an exemplary embodiment of a receiving module for an exemplary display device according to the present invention. FIG. 2 is an exploded perspective view illustrating the exemplary receiving module in FIG. 1.

Referring to FIGS. 1 and 2, a receiving module 100 for a display device receives parts of a display device such as an optical unit, a display panel, etc., as will be described below with respect to FIG. 9. The receiving module 100 may be employed in a mobile product having a small size such as a cellular phone.

The receiving module 100 includes a receiving frame 10 and a receiving container 20.

The receiving frame 10 includes a bottom part 5 and a plurality of side parts 11, 13, 15 and 17.

The bottom part 5 may have a substantially rectangular plate shape. In this exemplary embodiment, the bottom part 5 includes two long sides facing each other and two short sides facing each other. The bottom part 5 has an opening 9.

In this exemplary embodiment, the receiving frame 10 includes four side parts 11, 13, 15 and 17 extending from the four sides of the bottom part 5 to define a receiving space. The four side parts 11, 13, 15 and 17 are defined as a first side part 11, a second side part 13, a third side part 15 and a fourth side part 17. The first side part 11 and the second side part 13 extend from the short sides of the bottom part 5 and face each other. The third side part 15 and the fourth side part 17 extend from the long sides of the bottom part 5, and face each other. The third side part 15 and the fourth side part 17 are connected to the first side part 11 and the second side part 13.

The receiving frame 10 may include plastic. A stepped portion 7, see FIG. 3, having two steps is formed on an upper portion of the first side part 11, the second side part 13, the third side part 15 and the fourth side part 17. The engaging protrusions 12 and 16 are formed on an outer surface of the first side part 11, the second side part 13, the third side part 15 and the fourth side part 17. Each of the engaging protrusions 12 and 16 may be gradually thinner from an upper portion to a lower portion, and thus inclined to the outer surface.

The receiving container 20 may include a metal chassis. The receiving container 20 includes the receiving frame 10, that is, the receiving frame 10 is received within the receiving container 20. The receiving container 20 may include a bottom plate 21, a first sidewall 30, a second sidewall 40, a third sidewall 50 and a fourth sidewall 60.

The bottom plate 21 is disposed on a rear surface of the bottom part 5 of the receiving frame 10. The bottom plate 21 covers the opening 9 formed through the bottom part 5.

The first sidewall 30, the second sidewall 40, the third sidewall 50 and the fourth sidewall 60 extend from four edges of the bottom plate 21. The first sidewall 30, the second sidewall 40, the third sidewall 50 and the fourth sidewall 60 face the outer surface of the first side part 11, the second side part 13, the third side part 15 and the fourth side part 17, respectively.

The first sidewall 30, the second sidewall 40, the third sidewall 50 and the fourth sidewall 60 include a hemming structure. The hemming structure represents a structure in which a predetermined portion of a member is bent, and thus at least two portions of the member are overlapped and may further contact each other. When a member has a hemming structure, the member has great strength against an external force such as a bending stress or a twisting stress.

Figure 3:
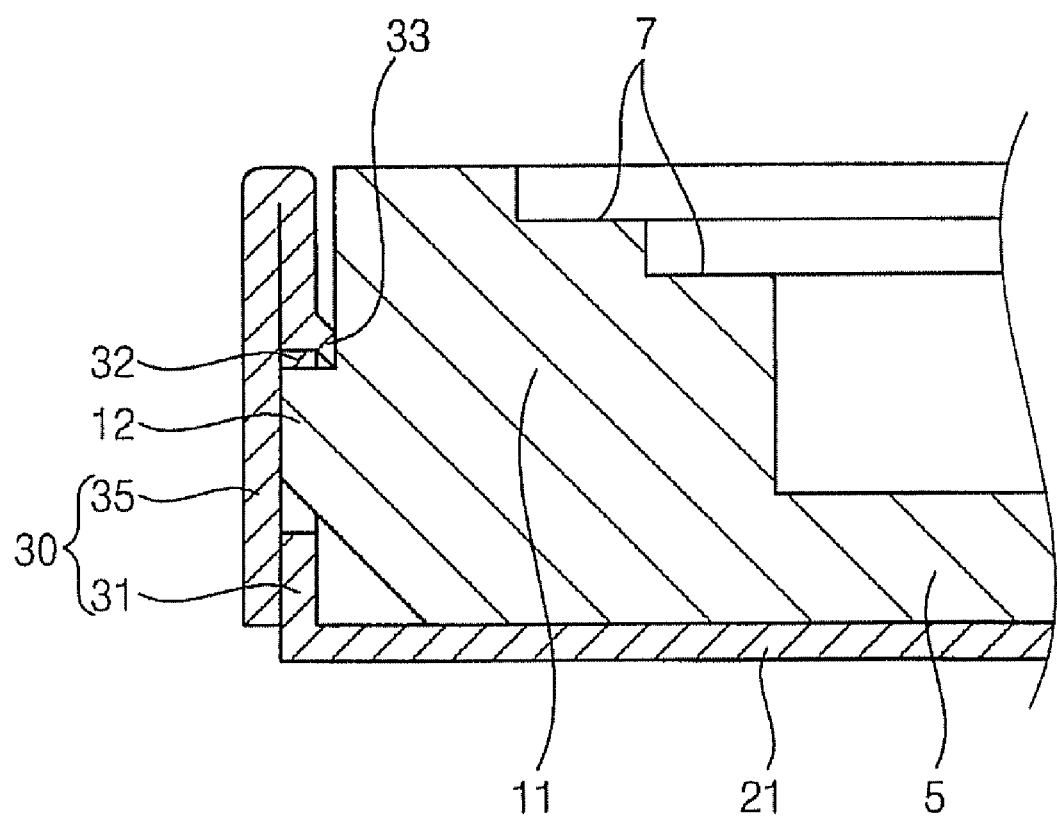
FIG. 3 is a cross-sectional view taken along line I-I' in FIG. 2.

FIG. 3 is a cross-sectional view taken along line I-I' in FIG. 2.

Referring to FIGS. 1, 2 and 3, the first sidewall 30, the second sidewall 40, the third sidewall 50 and the fourth sidewall 60 include two facing side plates forming the hemming structure. In FIGS. 1 to 3, the first sidewall 30 includes a first side plate 31 and a second side plate 35, and the third sidewall 50 includes a first side plate 51 and a second side plate 55. In this exemplary embodiment, since the first sidewall 30, the second sidewall 40, the third sidewall 50 and the fourth sidewall 60 have substantially the same function and structure, only the first sidewall 30 will be described in detail.

The first side plate 31 of the first sidewall 30 extends from an edge of the bottom plate 21 to face the outer surface of the first side part 11. The first side plate 31 may extend to an upper end portion of the first side part 11. An engaging hole 32 is formed through the first side plate 31. An engaging protrusion 12 formed on the first side part 11 is inserted into the engaging hole 32. Other engaging holes 42 and 62 are shown on second sidewall 40 and fourth sidewall 60.

A catching protrusion 33 is formed on the first side plate 31, and over the engaging hole 32 of the first side plate 31. The catching protrusion 33 is formed adjacent to an upper portion of the engaging protrusion 12. When the receiving frame 10 is downwardly received in the receiving container 20, the engaging protrusion 12 is inserted into the engaging hole 32. The catching protrusion 33 is guided by the outer surface of the first side part 11 to catch the upper portion of the engaging protrusion 12. Other catching protrusions 43 and 63 are shown on second sidewall 40 and fourth sidewall 60, relative to the engaging holes 42 and 62, respectively.

The second side plate 35 faces an outer surface of the first side plate 31. The second side plate 35 is bent at an upper end of the first side plate 31, furthest away from the bottom plate 21, and extends toward a lower end of the first side plate 31 along the outer surface of the first side plate 31. Thus, the second side plate 35 covers the engaging hole 32 formed through the first side plate 31. The second side plate 35 may make contact with the first side plate 31. In one exemplary embodiment, the second side plate 35 entirely makes contact with the outer surface of the first side plate 31, such that the second side plate 35 is in face-to-face contact with the first side plate 31. In one exemplary embodiment, the second sidewall 40, the third sidewall 50 and the fourth sidewall 60 of the receiving container 20 may have a hemming structure, similar to the overlapped first and second side plates 31 and 35 of the first sidewall 30.

The receiving container 20 having the hemming structure may have greater strength against an external force such as a bending stress or a twisting stress than a receiving container having a typical plate-shaped sidewall facing a side part by more than about 1.5 times.

Thus, a display panel or other parts of a display device may be prevented from damage due to an impact, such as a bending stress or a twisting stress that may be incurred when a display device is dropped or otherwise mishandled.

If the second side plate 35 is bent at the upper end of the first side plate 31 and is interposed between the first side plate 31 and the first side part 11, then the second side plate 35 may be difficult to extend to a portion under the engaging hole 32 of the first side plate 31. Thus, in such a case, the second side plate 35 would extend from the upper end of the first side plate 31 to the engaging hole 32, and an increase in strength of the receiving container 20 would be restricted.

In contrast, in the exemplary embodiment of the present invention, when the second side plate 35 is bent to face the outer surface of the first side plate 31, the second side plate 35 may extend to the lower end of the first side plate 31, to thereby greatly increase the strength of the receiving container 20.

Although the second side plate 35 covers the engaging hole 32, the engaging protrusion 12 formed on the first side part 11 may be inserted into the engaging hole 32 without difficulty. For example, a depth of the engaging protrusion 12 may be substantially the same as a thickness of the first side plate 31. Thus, the receiving frame 10 may be firmly coupled to the receiving container 20, thereby preventing the receiving frame 10 from being separated from the receiving container 20 due to an external impact.

Figure 4:
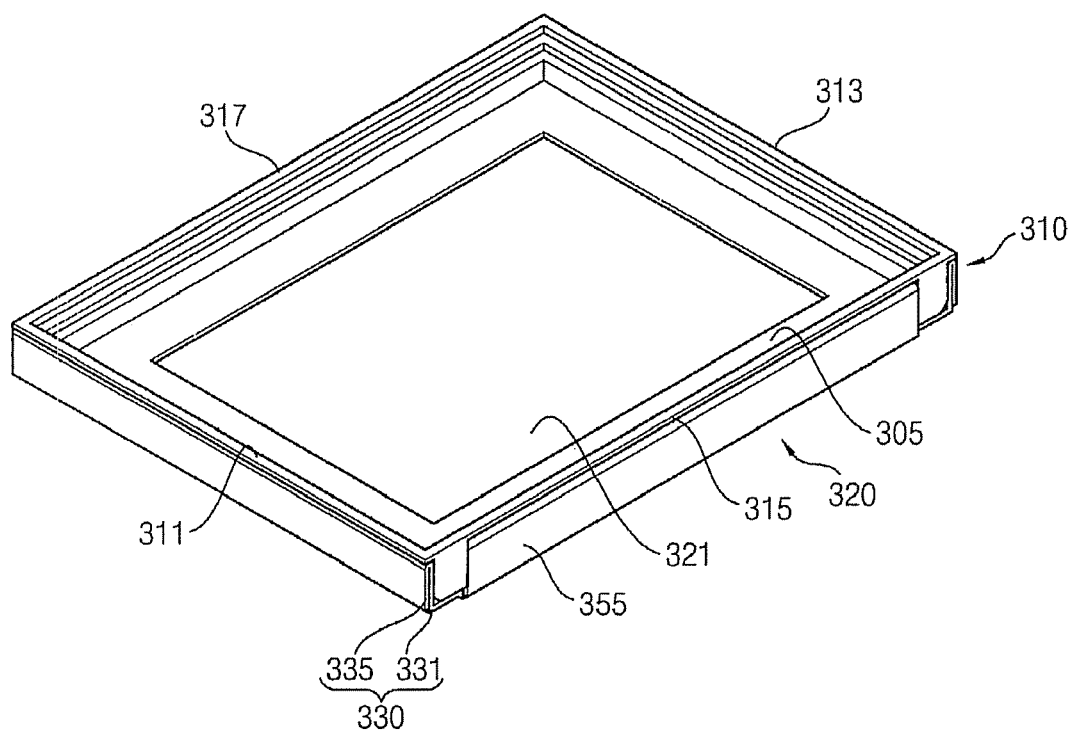
FIG. 4 is a perspective view illustrating another exemplary embodiment of a receiving module for an exemplary display device according to the present invention.
Figure 5:
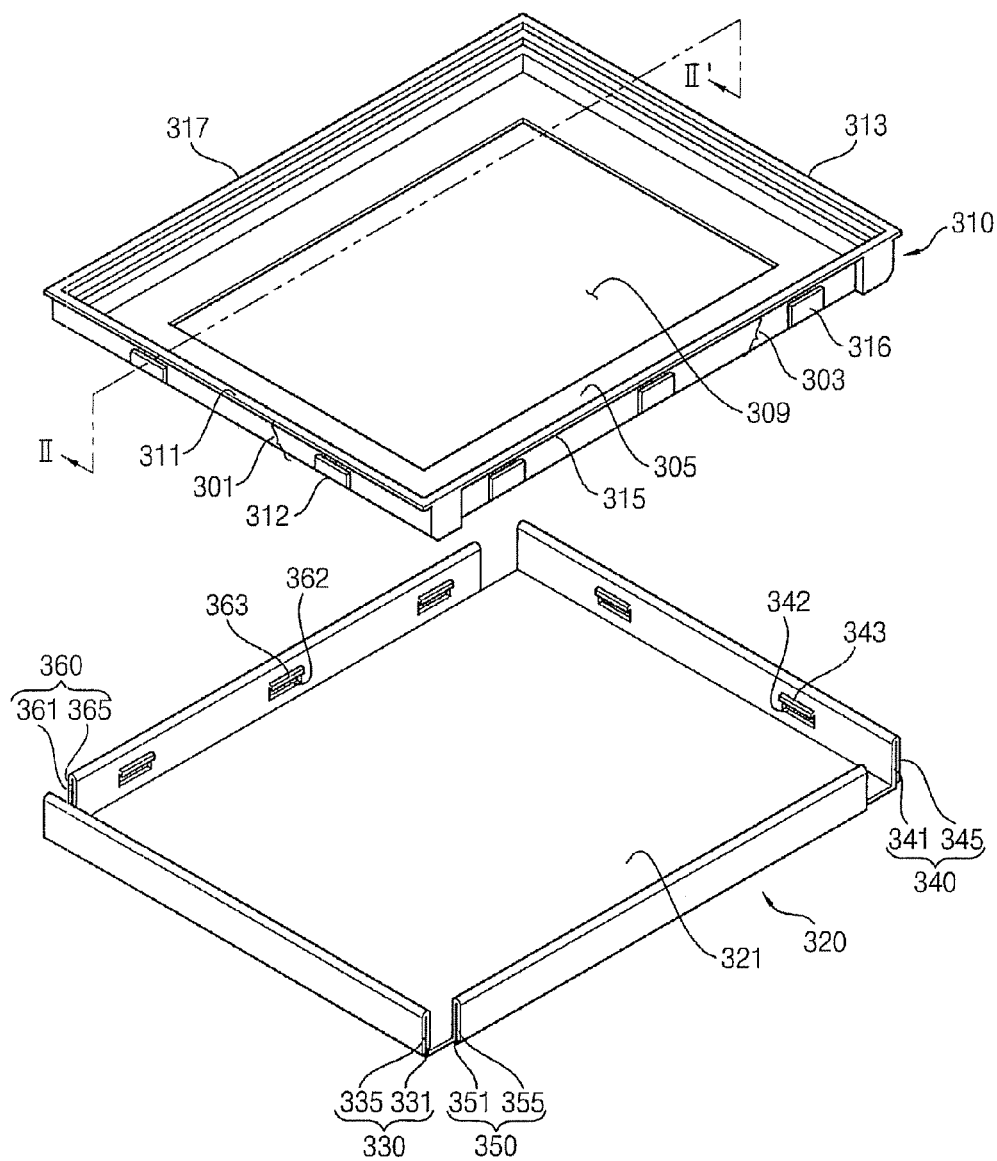
FIG. 5 is an exploded perspective view illustrating the exemplary receiving module in FIG. 4.
Figure 6:
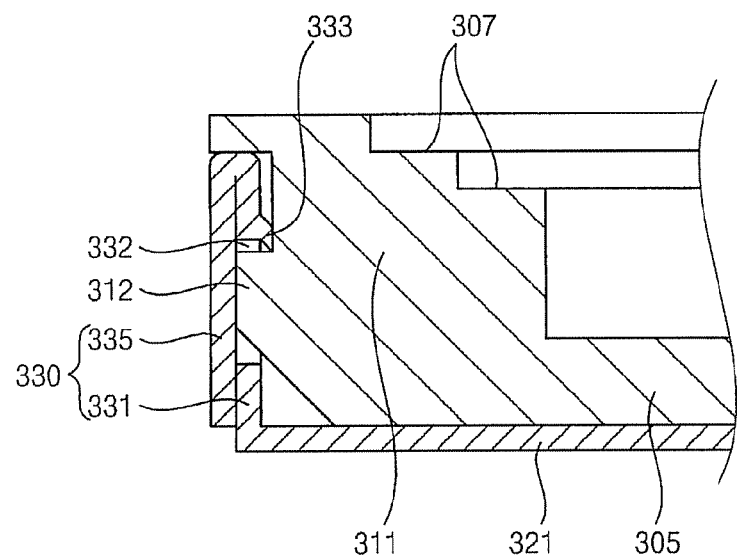
FIG. 6 is a cross-sectional view taken along line II-II' in FIG. 5.

FIG. 4 is a perspective view illustrating another exemplary embodiment of a receiving module for an exemplary display device according to the present invention. FIG. 5 is an exploded perspective view illustrating the receiving module in FIG. 4. FIG. 6 is a cross-sectional view taken along line II-II' in FIG. 5.

Referring to FIGS. 4, 5 and 6, a receiving module 300 for a display device includes a receiving frame 310 and a receiving container 320.

The receiving frame 310 includes a bottom part 305, a first side part 311, a second side part 313, a third side part 315 and a fourth side part 317. A stepped portion 307, see FIG. 6, having two steps is formed on an upper portion of the first side part 311, the second side part 313, the third side part 315 and the fourth side part 317. The bottom part 305 includes an opening 309. The receiving frame 310 may be substantially the same as the receiving frame 10 illustrated in FIGS. 1, 2 and 3 except for a shape of the first side part 311, the second side part 313, the third side part 315 and the fourth side part 317.

In this exemplary embodiment, a first guide groove 301, a second guide groove (not shown), a third guide groove 303 and a fourth guide groove (not shown) are formed on an outer surface of the first side part 311, the second side part 313, the third side part 315 and the fourth side part 317, respectively. A guide groove is formed on each of the side parts, thereby reducing a total size of the receiving module 300, which includes a thickness of a wall.

A first guide groove 301 may be formed on the first side part 311 so as to be open to a side portion and a lower portion of the first side part 311. The second guide groove may be formed similar to the first guide groove 301. The third guide groove 303 may be formed to have a length smaller than that of the third side part 315 and open to a lower portion of the third side part 315. The fourth guide groove may be formed similar to the third guide groove 303.

Engaging protrusions 312 and 316 are formed on a base surface of the first guide groove 301 and the third guide groove 303, respectively. Although not shown in FIGS. 4 to 6, engaging protrusions are also formed on a base surface of the second and fourth guide grooves.

The receiving container 320 includes a bottom plate 321, a first sidewall 330, a second sidewall 340, a third sidewall 350 and a fourth sidewall 360. The receiving container 320 may be substantially the same as the receiving container 20 illustrated in FIGS. 1, 2 and 3 except that the first sidewall 330, the second sidewall 340, the third sidewall 350 and the fourth sidewall 360 are spaced apart from each other at respective corners of the receiving container 320. The first sidewall 330 includes a first side plate 331 and a second side plate 335, the third sidewall 350 includes a first side plate 351 and a second side plate 355, the second sidewall 340 includes a first side plate 341 and a second side plate 345, and the fourth sidewall 360 includes a first side plate 361 and a second side plate 365.

The first sidewall 330, the second sidewall 340, the third sidewall 350 and the fourth sidewall 360 are disposed at the first guide groove 301, the second guide groove, the third guide groove 303 and the fourth guide groove, respectively. Second side plates may not protrude from the side parts so as to reduce a size of the receiving module 300. In one exemplary embodiment, second side plates 335 and 355 may not protrude from the first and third side parts 311 and 315, respectively. In other words, a width of a wall of the receiving module 300 including the first side part 311 and the first sidewall 330 is reduced because of the first guide groove 301. In such an embodiment, an outer surface of the second side plate 355 may be flush with an outer surface of an upper end portion of the first side part 311. An engaging hole 332 is formed through sidewall 330 and comparable engaging holes 362 and 342 are formed through sidewalls 340 and 360, respectively. This embodiment further includes a catching protrusion 333 on first side plate 331. Comparable catching protrusions 343, 363 are shown on second sidewall 340 and fourth sidewall 360, respectively.

In order to reduce the size of the receiving module 300, various changes and modifications may be made by one of ordinary skill in the art, such as in a shape of the guide grooves at the side parts 311, 313, 315, 317 of the receiving frame 310 and a spacing interval at a corner between the sidewalls 330, 340, 350, 360 of the receiving container 320.

Figure 7:
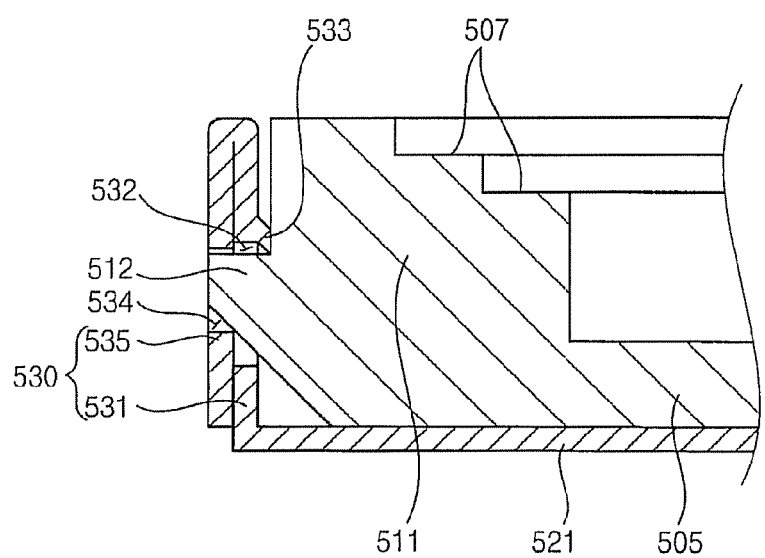
FIG. 7 is a cross-sectional view illustrating still another exemplary embodiment of a receiving module for an exemplary display device according to the present invention.

FIG. 7 is a cross-sectional view illustrating still another exemplary embodiment of a receiving module for an exemplary display device according to the present invention.

Referring to FIG. 7, a receiving module 500 for a display device includes a receiving frame and a receiving container.

The receiving frame includes a bottom part 505, a first side part 511, a second side part, a third side part and a fourth side part. The receiving frame may be substantially the same as the receiving frame 10 illustrated in FIG. 2 except that an engaging protrusion 512 formed at each of the side parts includes a longer length than the engaging protrusion 12 of the receiving frame 10 in FIG. 2. A stepped portion 507 having two steps is formed on an upper portion of the first side part 511 and on the second side part, the third side part and the fourth side part, not shown.

The receiving container includes a bottom plate 521, a first sidewall 530, a second sidewall, a third sidewall and a fourth sidewall. A first engaging hole is formed through a first side plate of each sidewall of the receiving container. For convenience of description, the first engaging hole 532 formed in the first side plate 531 of first sidewall 530 will be described, and the remaining sidewalls may include similar structures. The engaging protrusion 512 is inserted into the first engaging hole 532. The receiving container may be substantially the same as the receiving container 20 illustrated in FIG. 2 except that a second engaging hole 534 is formed through the second side plate 535 of the first sidewall 530, and corresponding to the first engaging hole 532.

The engaging protrusion 512 formed on the first side part 511 is inserted into the first engaging hole 532 and the second engaging hole 534. The engaging protrusion 512 may have a length substantially equal to combined widths of the first and second side plates 531, 535. An outer surface of the engaging protrusion 512 may be substantially flush with an outer surface of the second side plate 535. A catching protrusion 533 is formed on the first side plate 531, and catches an upper portion of the engaging protrusion 512. Thus, the receiving frame and the receiving container of the receiving module 500 may be firmly coupled to each other in comparison with the receiving module 100 illustrated in FIGS. 1 to 3.

The second side plate 535 is bent at an upper end of the first side plate 531 and extends toward a lower end of the first side plate 531. Thus, the first sidewall 530 has a sufficiently wide width due to the first and second side plates 531, 535 to prevent the second engaging hole 534 from deteriorating the strength of the receiving module 500. Also, the second side plate 535 may have a wider width, such that the second engaging hole 534 may not be an obstacle to increase the strength of the receiving module 500.

Figure 8:
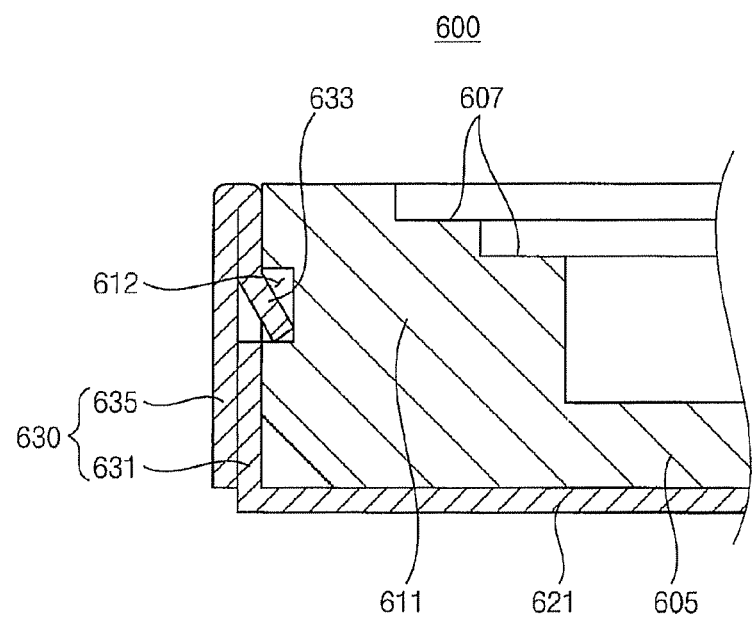
FIG. 8 is a cross-sectional view illustrating still another exemplary embodiment of a receiving module for an exemplary display device according to the present invention.

FIG. 8 is a cross-sectional view illustrating still another exemplary embodiment of a receiving module for an exemplary display device according to the present invention.

Referring to FIG. 8, a receiving module 600 for a display device includes a receiving frame and a receiving container.

The receiving frame includes a bottom part 605, a first side part 611, a second side part, a third side part and a fourth side part. The receiving frame may be substantially the same as the receiving frame 10 illustrated in FIG. 2 except that an engaging protrusion is removed and an engaging groove 612 is formed on each side part. A stepped portion 607, see FIG. 3, having two steps is formed on an upper portion of the first side part 611, the second side part, the third side part and the fourth side part.

The receiving container includes a bottom plate 621, a first sidewall 630, a second sidewall, a third sidewall and a fourth sidewall. The receiving container may be substantially the same as the receiving container 20 illustrated in FIG. 2 except that an engaging hole is removed and an engaging protrusion 633 is formed at the first side plate 631 of each sidewall. A portion of the first side plate 631 is cut and bent toward the first side part 611 to form the engaging protrusion 633. A second side plate 635 of each sidewall of the receiving container is bent at an upper end of a first side plate 631 to make contact with an outer surface of the first side plate 631. The second side plate 635 extends toward a lower end of the first side plate 631.

When the receiving frame is downwardly received in the receiving container, the engaging protrusion 633 formed at the first side plate 631 of each sidewall of the receiving container is transformed, such as by being bent back towards the remainder of the first side plate 631. The engaging protrusion 633 is returned to an original shape and inserted into the engaging groove 612 of the side part 611, such that the receiving frame is firmly coupled to the receiving container.

As described in FIGS. 2, 5, 7 and 8, the receiving container has a predetermined hemming structure. Particularly, the first side plate of each sidewall of the receiving container is connected to the edge of the bottom plate, the second side plate of each sidewall of the receiving container is bent at the upper end of the first side plate and covers the outer surface of the first side plate.

Alternatively, the receiving container may have a hemming structure different from the above-described structure. Particularly, the second side plate may be connected to an edge of the bottom plate, and the first side plate may be bent at an upper end of the second side plate and cover an inner surface of the second side plate. Also, the engaging hole and the catching protrusion may be formed at the first side plate.

Display Device

Figure 9:
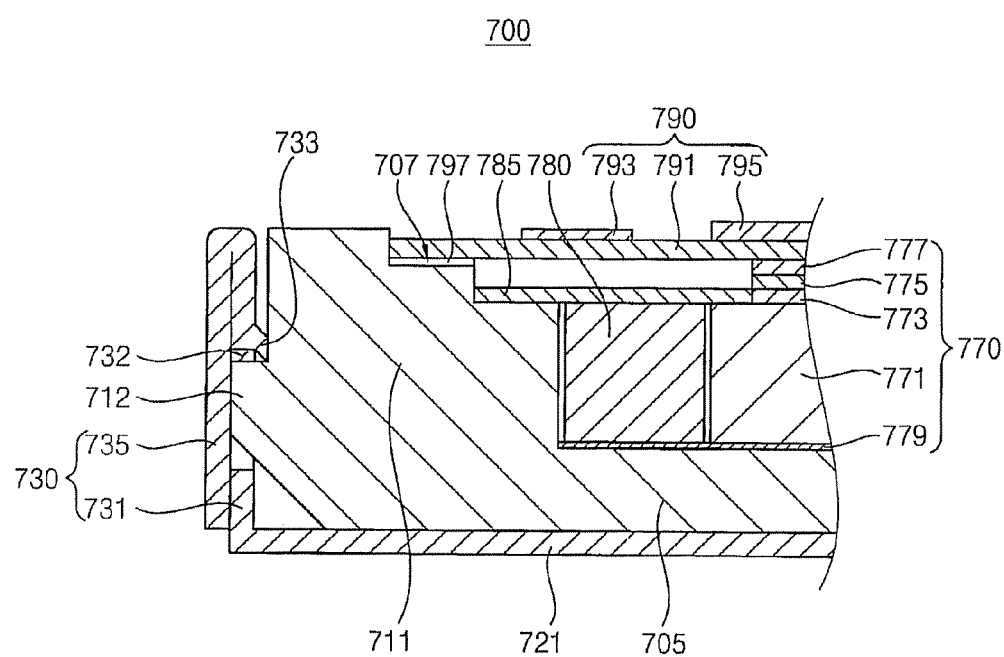
FIG. 9 is a cross-sectional view illustrating an exemplary embodiment of a display device according to the present invention.

FIG. 9 is a cross-sectional view illustrating an exemplary embodiment of a display device according to the present invention.

Referring to FIG. 9, a display device 700 includes a receiving frame, a receiving container, an optical unit 770, a point light source 780 and a display panel 790.

The receiving frame and the receiving container may be substantially the same as the receiving frame 10 and the receiving container 20 illustrated in FIGS. 1, 2 and 3. Alternatively, the receiving frame and the receiving container may be replaced with the receiving frames 310, 510 and 610 and the receiving containers 320, 520 and 620 illustrated in FIGS. 5, 7 and 8, respectively.

The optical unit 770 is disposed on the bottom part 705 of the receiving frame. The optical unit 770 may include a light-guiding plate 771, a light-diffusing sheet 773 and light-condensing sheets 775 and 777. The light-guiding plate 771 is spaced apart from an inner surface of the first side part 711 of the receiving frame by a predetermined distance. The light-diffusing sheet 773 and the light-condensing sheets 775 and 777 are successively disposed on the light-guiding plate 771. The optical unit 770 may further include a light-reflecting sheet 779. The light-reflecting sheet 779 is disposed between the bottom part 705 and the light-guiding plate 771 to cover an opening formed through the bottom part 705 and to reflect light exiting a bottom surface of the light guiding plate 771 back towards the display panel 790.

The point light source 780 is disposed between the first side part 711 and a side surface of the light-guiding plate 771, and may be disposed on the light-reflecting sheet 779. The display device 700 may include a plurality of point light sources 780. The point light source 780 may include a white light-emitting diode ("LED") emitting a white light. Alternatively, the point light source 780 may include a red light-emitting chip emitting red light, a green light-emitting chip emitting green light, and a blue light-emitting chip emitting blue light.

The display device 700 may further include a power printed circuit film 785 having flexibility. A portion of the power printed circuit film 785 may overlap an upper edge portion of the light-guiding plate 771. The point light source 780 is mounted on the power printed circuit film 785. A groove (not shown) may be formed on the first side part 711. The power printed circuit film 785 may be drawn out through the groove.

The display panel 790 is disposed on the optical unit 770. The display panel 790 may be supported by a stepped portion 707 formed at an upper portion of the first side part 711, the second side part, the third side part, and the fourth side part. The display device 700 may further include an adhesive member 797 interposed between the stepped portion 707 and the display panel 790. The display panel 790 may include a lower substrate 791, an upper substrate 795 and a liquid crystal layer (not shown).

The lower substrate 791 may include a plurality of pixels. The upper substrate 795 is disposed on a portion of the lower substrate 791 except for an edge portion of the lower substrate 791 adjacent to the first side part 711. The upper substrate 795 may include a color filter layer facing the pixels. The liquid crystal layer is interposed between the lower substrate 791 and the upper substrate 795.

The display panel 790 may further include a driver chip 793. The driver chip 793 is mounted on the lower substrate 791 corresponding to the point light sources 780. A panel printed circuit film may be connected to an edge of the lower substrate 791 having the driver chip 793, such that the driver chip 793 may be electrically connected to the panel printed circuit film. The driver chip 793 drives the display panel 790 in response to a panel driving signal externally applied to the panel printed circuit film. The power printed circuit film 785 having the point light source 780 may be drawn out of the receiving frame to be electrically connected to the panel printed circuit film.

In a mobile display device 700 such as a cellular phone, a thickness of the display panel 790, in one exemplary embodiment, a thickness of the lower substrate 791 and the upper substrate 795 is only a few millimeters. Thus, the display panel 790 is weak against an external force such as a bending stress or a twisting stress.

A second side plate 735 of each sidewall of the receiving container is bent at an upper end of a first side plate 731 to make contact with an outer surface of the first side plate 731. The second side plate 735 extends toward a lower end of the first side plate 731. The first side plate 731 extends from the bottom plate 721. Thus, each sidewall of the receiving container has a double-walled structure, and the sidewall 730 shows an exemplary embodiment of such a structure. As a result, the receiving container may have great strength against a bending stress or a twisting stress. Also, an engaging protrusion 712 of the receiving frame is firmly coupled to an engaging hole 732 formed through the first side plate 731 of each sidewall. Therefore, the display panel 790, the optical unit 770, etc. may be prevented from damage due to an external force such as a bending stress or a twisting stress.

According to the present invention, a receiving container having metal includes a sidewall having a hemming structure. A second side plate of the sidewall is outwardly bent at an upper end of the first side plate and has a width similar to a first side plate. The receiving frame may be firmly coupled to the receiving container by coupling an engaging protrusion and an engaging hole or groove. Thus, the strength of a receiving module for a display device may be improved, and the display device may have an increased resistivity to an external force.

According to the present invention, a method for improving strength of a receiving module within a display device includes defining a receiving space in a receiving frame, the receiving frame including a bottom part and a side part extending from a peripheral portion of the bottom part, disposing a bottom plate of a receiving container on a rear surface of the bottom part, extending a first side plate of a sidewall of the receiving container from an edge portion of the bottom plate, coupling the first side plate to the side part to face an outer surface of the side part, and bending a second side plate at an upper end of the first side plate to face an outer surface of the first side plate.

The method may further include forming an engaging protrusion on the side part of the receiving frame, forming a first engaging hole through the first side plate of the receiving container, and inserting the engaging protrusion into the first engaging hole. The method may further include extending a catching protrusion from an inner surface of the first side plate to catch an upper portion of the engaging protrusion. Bending a second side plate at an upper end of the first side plate may include abutting the second side plate to the first side plate in face-to-face contact. Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A receiving module for a display device, the receiving module comprising:
 a receiving frame comprising a plurality of side parts to define a receiving space for a display panel; and
 a receiving container comprising:
  a bottom plate disposed under the receiving space; and
  a plurality of sidewalls, at least one of the sidewalls comprising a first side plate extending from an edge portion of the bottom plate and coupled to a side part of the receiving frame to face an outer surface of the side part, and a second side plate bent at an upper end of the first side plate to face an outer surface of the first side plate.

2. The receiving module of claim 1, wherein the receiving frame further comprises an engaging protrusion formed on at least one of the side parts, and at least one of the sidewalls of the receiving container includes a first engaging hole formed through a first side plate, the engaging protrusion inserted into the first engaging hole.

3. The receiving module of claim 2, wherein a second side plate of the at least one of the sidewalls covers the first engaging hole, and extends toward a lower portion of the first side plate including the first engaging hole.

4. The receiving module of claim 3, wherein the second side plate of the at least one of the sidewalls makes contact with the first side plate including the first engaging hole.

5. The receiving module of claim 2, wherein the receiving container further comprises a catching protrusion protruding from an inner surface of the first side plate including the first engaging hole to catch an upper portion of the engaging protrusion.

6. The receiving module of claim 2, wherein the receiving container has a second engaging hole formed through the second side plate of the at least one of the sidewalls, the engaging protrusion inserted into the second engaging hole.

7. The receiving module of claim 6, wherein the second engaging hole is smaller than the first engaging hole.

8. The receiving module of claim 1, wherein the receiving container has an engaging groove formed on at least one of the side parts, and the receiving container further comprises an engaging protrusion formed at a corresponding first side plate to be inserted into the engaging groove.

9. The receiving module of claim 1, wherein each side part of the receiving frame includes a guide groove and an outer surface of each second side plate forms a substantially planar surface with an outermost side surface of each corresponding side part.

10. The receiving module of claim 1 wherein each second side plate is in face-to-face contact with each corresponding first side plate.

11. A display device comprising:
 a receiving frame comprising a plurality of side parts to define a receiving space for a display panel;
 a receiving container comprising:
  a bottom plate disposed under the receiving space; and
  a plurality of sidewalls, at least one of the sidewall comprising a first side plate extending from an edge portion of the bottom plate and coupled to a corresponding side part to face an outer surface of each of the side part, and a second side plate bent at an upper end of the first side plate to face an outer surface of the first side plate;
 an optical unit disposed on the bottom plate;
 a point light source disposed adjacent to an inner surface of at least one of the side parts of the receiving frame to face a side surface of the optical unit; and
 a display panel disposed on the optical unit and supported by a stepped portion formed at the side parts of the receiving frame.

12. The display device of claim 11, wherein the receiving frame further comprises an engaging protrusion formed on an outer surface of at least one of the side parts, and at least one of the sidewalls of the receiving container includes an engaging hole formed through the first side plate, the engaging protrusion inserted into the engaging hole.

13. The display device of claim 12, wherein the second side plate of the at least one of the sidewalls covers and makes contact with the engaging hole, and extends toward a lower portion of the first side plate including the engaging hole.

14. The display device of claim 13, wherein the receiving container further comprises a catching protrusion protruding from an inner surface of the first side plate including the engaging hole to catch an upper portion of the engaging protrusion.

15. The display device of claim 11, wherein the receiving container has an engaging groove formed on a side part of the side parts, and the receiving container further comprises an engaging protrusion formed at a corresponding first side plate to be inserted into the engaging groove.

16. The display device of claim 11, wherein each second side plate is in face-to-face contact with each corresponding first side plate.

* * * * *